(12) United States Patent
Shin (10) Patent No.: US 7,774,390 B2
(45) Date of Patent: Aug. 10, 2010

(54) APPARATUS FOR COLLECTING GARBAGE BLOCK OF NONVOLATILE MEMORY ACCORDING TO POWER STATE AND METHOD OF COLLECTING THE SAME

(75) Inventor: Dong-kun Shin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 277 days.

(21) Appl. No.: 11/635,018

(22) Filed: Dec. 7, 2006

(65) Prior Publication Data

US 2007/0174579 A1 Jul. 26, 2007

(30) Foreign Application Priority Data

Jan. 20, 2006 (KR) .................. 10-2006-0006472

(51) Int. Cl.
*G06F 17/30* (2006.01)

(52) U.S. Cl. .................. 707/814; 707/816; 707/819

(58) Field of Classification Search .......... 707/206, 707/10, 814, 819; 711/170, 103, 114; 709/107; 718/1; 463/43; 710/1
See application file for complete search history.

(56) References Cited

U.S. PATENT DOCUMENTS

| | | | |
|---|---|---|---|
| 5,640,529 A | 6/1997 | Hasbun | |
| 6,579,185 B1 * | 6/2003 | Honda et al. .................. | 463/43 |
| 6,766,336 B2 * | 7/2004 | Kawamoto .................. | 707/206 |
| 7,191,441 B2 * | 3/2007 | Abbott et al. .................. | 718/1 |
| 2001/0042074 A1 * | 11/2001 | Kawamoto .................. | 707/206 |
| 2003/0140085 A1 * | 7/2003 | Moir et al. .................. | 709/107 |
| 2004/0248612 A1 | 12/2004 | Lee et al. | |
| 2005/0108075 A1 | 5/2005 | Douglis et al. | |
| 2005/0144361 A1 * | 6/2005 | Gonzalez et al. ............ | 711/103 |
| 2005/0149686 A1 * | 7/2005 | Bacon et al. ................. | 711/170 |
| 2005/0198088 A1 * | 9/2005 | Subramoney et al. ........ | 707/206 |
| 2006/0112222 A1 * | 5/2006 | Barrall ........................ | 711/114 |
| 2006/0190697 A1 * | 8/2006 | Grant ........................... | 711/170 |
| 2007/0143560 A1 * | 6/2007 | Gorobets ..................... | 711/170 |
| 2007/0156998 A1 * | 7/2007 | Gorobets ..................... | 711/170 |

(Continued)

FOREIGN PATENT DOCUMENTS

JP 2000-172386 A 6/2000

(Continued)

OTHER PUBLICATIONS

Lin-Pin Chang et al., "Real-time Garbage Collection for FlashMemory Storage Systems of Real-time Embbed Systems", ACM, Nov. 2004, pp. 837-863.*

(Continued)

*Primary Examiner*—Thuy N Pardo
(74) *Attorney, Agent, or Firm*—Sughrue Mion, PLLC (57) ABSTRACT

Provided are an apparatus for collecting garbage blocks of a nonvolatile memory according to a power state and a method of collecting the same, and more particularly, an apparatus for collecting garbage blocks of a nonvolatile memory according to a power state and a method of collecting the same, in which an amount of power consumed by a portable device can be reduced by adjusting a garbage block collection operation on the basis of the power state of the portable device. The apparatus includes a power managing unit which collects physical blocks allocated to the nonvolatile memory on the basis of the power state of a portable device.

14 Claims, 8 Drawing Sheets

U.S. PATENT DOCUMENTS

2007/0168564 A1* 7/2007 Conley et al. ................... 710/1
2010/0049908 A1* 2/2010 Gonzalez et al. ............ 711/103

FOREIGN PATENT DOCUMENTS

| JP | 2003-122646 A | 4/2003 |
|---|---|---|
| JP | 2003-124874 A | 4/2003 |
| JP | 2004-178417 A | 6/2004 |
| KR | 10-2004-0104203 A | 12/2004 |
| WO | 2004/114639 A1 | 12/2004 |

OTHER PUBLICATIONS

Laurent Amsaleg et al., "Garbage Collection for a Client-Server Persistent Object Store", ACM, Aug. 1999, pp. 153-201.*
Yehua Du et al., Adaptive Energy-Aware Design of a Multi-Bank Flash -Memory Storage System, Hong Kong, China Aug. 17-19, 2005, Piscataway, NJ, USA, Aug. 17, 2005, pp. 311-316.

* cited by examiner

| BATTERY CHARGING STATE | PROCESS | DESCRIPTION |
|---|---|---|
| BEING CHARGED | PERFORM GARBAGE BLOCK COLLECTION UP TO PHYSICAL BLOCK REQUIRING LARGE GARBAGE BLOCK COLLECTION VALUE | MAINTAIN THE NUMBER OF FREE BLOCKS AT PREDETERMINED FIRST THRESHOLD VALUE OR MORE |
| 100 | PERFORM GARBAGE BLOCK COLLECTION FOR PHYSICAL BLOCK REQUIRING SMALL GARBAGE BLOCK COLLECTION VALUE | MAINTAIN THE NUMBER OF FREE BLOCKS AT PREDETERMINED FIRST THRESHOLD VALUE OR MORE |
| 50 | PERFORM GARBAGE BLOCK COLLECTION FOR PHYSICAL BLOCK REQUIRING SMALL GARBAGE BLOCK COLLECTION VALUE | MAINTAIN THE NUMBER OF FREE BLOCKS AT PREDETERMINED FIRST THRESHOLD VALUE |
| 20 | PERFORM GARBAGE BLOCK COLLECTION FOR ONLY PHYSICAL BLOCK REQUIRING SMALL GARBAGE BLOCK COLLECTION VALUE | MAINTAIN THE NUMBER OF FREE BLOCKS AT PREDETERMINED FIRST THRESHOLD VALUE OR LESS |

| BATTERY CHARGING STATE | PROCESS | DESCRIPTION |
|---|---|---|
| BEING CHARGED | SET GARBAGE BLOCK COLLECTION CYCLE TO VALUE SMALLER THAN SECOND THRESHOLD VALUE | MAINTAIN THE NUMBER OF FREE BLOCKS AT PREDETERMINED FIRST THRESHOLD VALUE OR MORE |
| 100 | SET GARBAGE BLOCK COLLECTION CYCLE TO VALUE SMALLER THAN SECOND THRESHOLD VALUE | MAINTAIN THE NUMBER OF FREE BLOCKS AT PREDETERMINED FIRST THRESHOLD VALUE OR MORE |
| 50 | SET GARBAGE BLOCK COLLECTION CYCLE TO SECOND THRESHOLD VALUE | MAINTAIN THE NUMBER OF FREE BLOCKS AT PREDETERMINED FIRST THRESHOLD VALUE |
| 20 | SET GARBAGE BLOCK COLLECTION CYCLE TO VALUE LARGER THAN SECOND THRESHOLD VALUE | MAINTAIN THE NUMBER OF FREE BLOCKS AT PREDETERMINED FIRST THRESHOLD VALUE OR LESS |

FIG. 5

APPARATUS FOR COLLECTING GARBAGE BLOCK OF NONVOLATILE MEMORY ACCORDING TO POWER STATE AND METHOD OF COLLECTING THE SAME

CROSS REFERENCE TO RELATED APPLICATION

This application claims priority from Korean Patent Application No. 10-2006-0006472 filed on Jan. 20, 2006, in the Korean Intellectual Property Office, the disclosure of which is incorporated herein by reference in its entirety.

BACKGROUND OF THE INVENTION

1. Field of the Invention

The present invention relates to an apparatus for collecting garbage blocks of a nonvolatile memory, and more particularly, to an apparatus for collecting garbage blocks of a nonvolatile memory according to a power state and a method of collecting the same, in which the amount of power consumed by a portable device can be reduced by adjusting a garbage block collection operation on the basis of the power state of the portable device.

2. Description of the Related Art

Generally, in a flash memory, new data cannot be rewritten on a page on which data is already written, and the existing data should be erased in a unit of a block so as to rewrite the new data. In this case, the flash memory refers to a representative nonvolatile memory in which written data is not erased, even if power supply is stopped.

Further, when the data written on a page is changed, new data is written on another page, and the previous data is moved to an invalid region to be managed. Therefore, a garbage block collection process is required.

Figure 1:
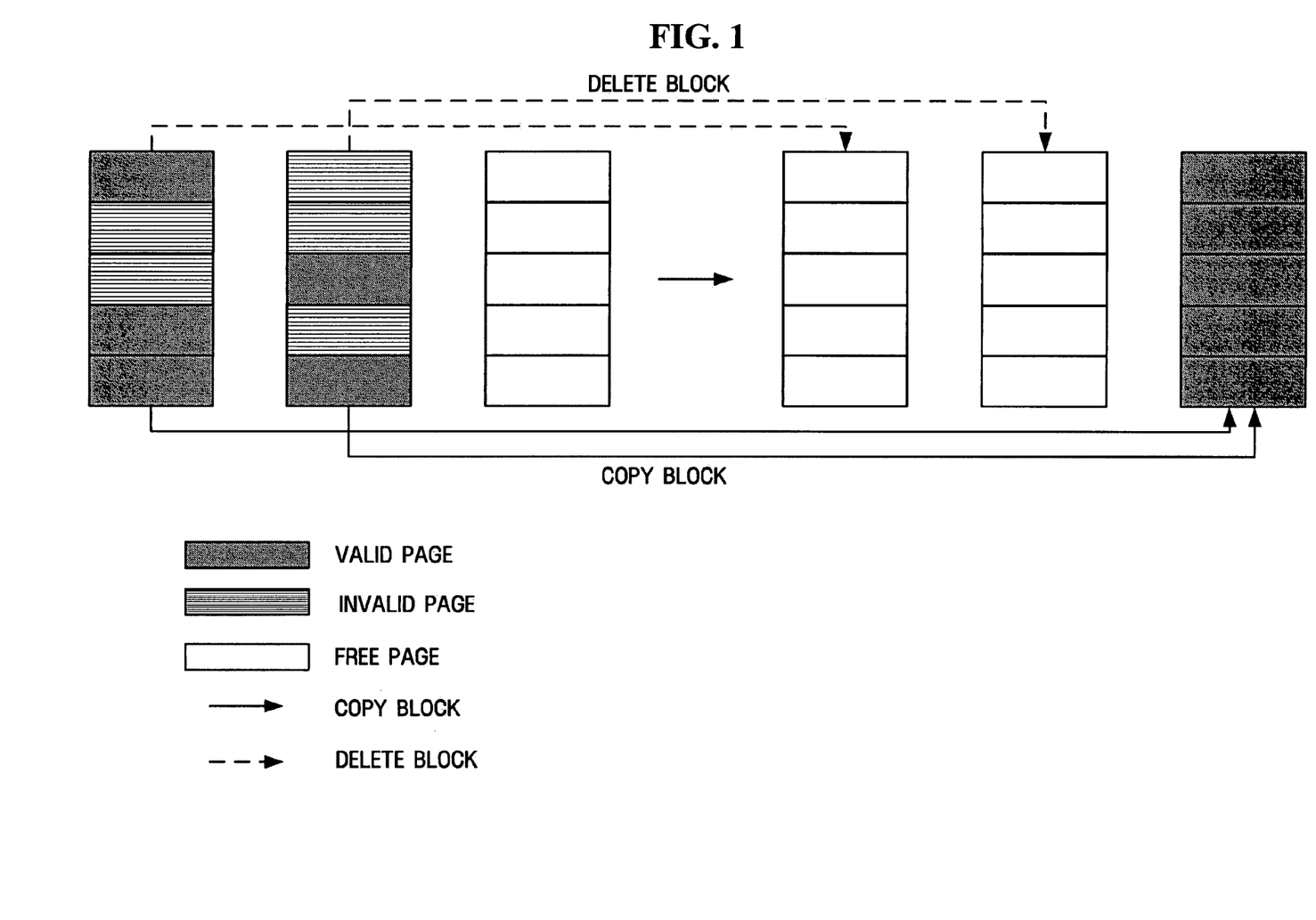
FIG. 1 is a diagram illustrating an operation of performing garbage block collection in a conventional flash memory.

FIG. 1 is a diagram illustrating an operation of performing garbage block collection in a conventional flash memory.

As shown in FIG. 1, according to the garbage block collection operation, only valid pages in specific blocks are copied to another block, and the corresponding blocks are erased so as to be reused.

In order to perform the garbage block collection process, writing and erasing processes are required. However, it takes a long time for the above-described garbage block collection process to be performed, and a large capacity of power is also consumed, as shown in Table 1.

TABLE 1

| Operation | Time | Power |
| --- | --- | --- |
| Read (one page) | 37 μS | 1.2 μJ |
| Program (one page) | 306 μS | 8.3 μJ |
| Delete (one block) | 1.8 mS | 21.9 μJ |

Further, when a flash memory is used in a mobile system, which operates using a battery, like a wireless terminal, it affects an allowable time of the battery to perform the garbage block collection process.

A conventional garbage block collecting system divides a flash memory into free blocks and allocated blocks, and includes a free block list and an allocated block list that manage the free blocks and the allocated blocks, respectively.

Further, the garbage block collecting system includes a garbage block collector that searches a corresponding allocated block from the allocated block list to delete it and then transmits it to the free block list, and a block allocator that allocates a predetermined block and requests the garbage block collector to perform garbage block collection.

For example, all blocks that are initially not used enter into the free block list, and if a new block is required so as to write data in the flash memory, the block allocator requests the free block list to allocate the new block. The free block list allocates one of the free blocks. In this case, the allocated block is added to the allocated block list.

Then, when the free blocks do not exist in the free block list and when available free blocks are smaller than data to be newly stored, the block allocator requests the garbage block collector to perform garbage block collection.

After the garbage block collector searches the allocated block in the allocated block list to delete it, the garbage block collector transmits the allocated block to the free block list. In this case, even when the garbage block collector is not requested to perform garbage block collection from an external apparatus, the garbage block collector may perform a garbage block collection process at a specific cycle time by using a timer, or perform the garbage block collection process when it is determined by a system idle detector that a system enters an idle state.

However, in order to search all allocated blocks in the allocated block list or reduce a garbage block collection operation time, the garbage block collector searches only a predetermined number of allocated blocks, and transmits them to the free block list. That is, the number of the allocated blocks deleted by the garbage block collector does not depend on a power state of a wireless terminal.

Accordingly, when a remaining battery capacity of the wireless terminal is insufficient, if the garbage block collector performs garbage block collection, a power of the battery is further consumed, and thus the remaining battery capacity may be further insufficient.

Korean Laid-Open Publication No. 2004-0104203 discloses a method of collecting garbage data in a mobile communication terminal, in which when collecting garbage data of a flash memory is performed or required in the mobile communication terminal, a mode of the mobile communication terminal is converted into a low power mode for a short time so as to prevent interruption from an external apparatus and the terminal performs normal garbage data collection, thereby causing the terminal to stably operate. However, in the above-described method, a technology for performing garbage block collection according to a power state of the wireless terminal is not described.

SUMMARY OF THE INVENTION

An aspect of the present invention is to provide an apparatus for collecting garbage blocks of a nonvolatile memory according to a power state and a method of performing the same, in which the power of a portable device can be more effectively consumed by adjusting a garbage block collection value and a garbage block collection operation cycle, when the garbage block collection is performed according to the power state of the portable device.

Aspects of the present invention are not limited to those mentioned above, and other aspects of the present invention will be apparently understood by those skilled in the art through the following description.

According to an aspect of the present invention, an apparatus for collecting garbage blocks of a nonvolatile memory according to a power state includes a power managing unit which collects physical blocks allocated to the nonvolatile memory on the basis of the power state of a portable device.

According to another aspect of the present invention, a method of collecting garbage blocks of a nonvolatile memory according to a power state includes checking the number of free blocks in the nonvolatile memory, checking the power state of a portable device, when the number of the free blocks is smaller than a first threshold value, performing garbage collection with respect to physical blocks including physical blocks requiring large garbage block collection values, when a power of the portable device is sufficient, and performing the garbage collection with respect to physical blocks requiring small garbage block collection values, when the power of the portable device is insufficient.

According to still another aspect of the present invention, a method of collecting garbage blocks of a nonvolatile memory according to a power state includes checking the number of free blocks in the nonvolatile memory, checking the power state of a portable device, when the number of the free blocks is smaller than a first threshold value, setting a garbage block collection cycle to a value smaller than a second threshold value, when the power of the portable device is sufficient, setting the garbage block collection cycle to a value larger than the second threshold value, when the power of the portable device is insufficient, and performing garbage collection with respect to physical blocks on the basis of the set garbage block collection cycle.

BRIEF DESCRIPTION OF THE DRAWINGS

The above and other aspects of the present invention will become more apparent by describing in detail preferred embodiments thereof with reference to the attached drawings, in which.

DESCRIPTION OF EXEMPLARY EMBODIMENTS

Aspects and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the present invention to those skilled in the art, and the present invention will only be defined by the appended claims. Like identification codes refer to like elements throughout the specification.

The exemplary embodiments of the present invention will now be described more fully with reference to the accompanying drawings, in which exemplary embodiments of the present invention are shown. It is to be understood that blocks in the accompanying block diagrams and compositions of steps in flow charts can be performed by computer program instructions. These computer program instructions can be provided to processors of, for example, general-purpose computers, special-purpose computers, and programmable data processing apparatuses. Therefore, the instructions performed by the computer or the processors of the programmable data processing apparatus generate means for executing functions described in the blocks in block diagrams or the steps in the flow charts. The computer program instructions can be stored in a computer available memory or a computer readable memory of the computer or the programmable data processing apparatus in order to realize the functions in a specific manner. Therefore, the instructions stored in the computer available memory or the computer readable memory can manufacture products including the instruction means for performing the functions described in the blocks in the block diagrams or the steps in the flow charts. Also, the computer program instructions can be loaded onto the computer or the computer programmable data processing apparatus. Therefore, a series of operational steps is performed in the computer or the programmable data processing apparatus to generate a process executed by the computer, which makes it possible for the instructions driving the computer or the programmable data processing apparatus to provide steps of executing the functions described in the blocks of the block diagrams or the steps of the flow charts.

Each block or each step may indicate a portion of a module, a segment or a code including one or more executable instructions for performing a specific logical function (or functions). It should be noted that, in some modifications of the present invention, the functions described in the blocks or the steps may be generated out of order. For example, two blocks or steps continuously shown can be actually performed at the same time, or they can be performed sometimes in reverse order according to the corresponding functions.

Figure 2:
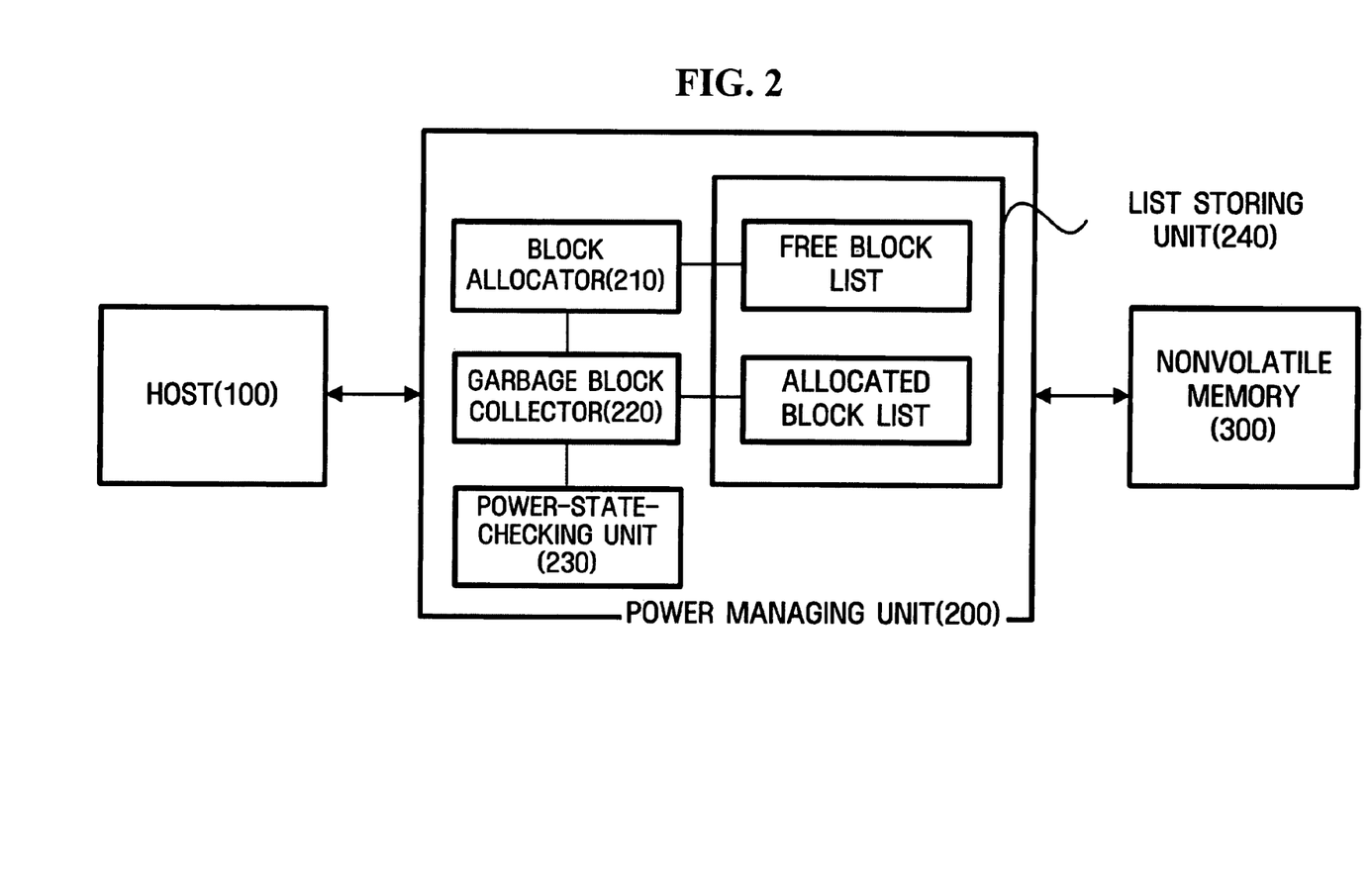
FIG. 2 is a block diagram illustrating an inner structure of an apparatus for collecting garbage blocks of a nonvolatile memory according to a power state in accordance with an exemplary embodiment of the present invention.

FIG. 2 is a block diagram illustrating an inner structure of an apparatus for collecting garbage blocks of a nonvolatile memory according to a power state in accordance with an exemplary embodiment of the present invention.

As shown in FIG. 2, the apparatus for collecting garbage blocks of a nonvolatile memory according to a power state includes a host 100, a power managing unit 200, and a nonvolatile memory 300 (that is, flash memory). In this case, the apparatus for collecting garbage blocks of a nonvolatile memory according to a power state is mounted on a portable device by which a user can use a predetermined function and information while moving, and examples of the portable device may include mobile phones, personal digital assistants (PDAs), solid state disks (SSDs), and the like.

At this time, each of the respective components in the embodiments, means, but is not limited to, a software component or hardware component such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a security multimedia card.

The host 100 transmits data to the nonvolatile memory 300 and receives the data from the nonvolatile memory 300 according to a user's instruction.

The power managing unit 200 performs garbage block collection according to a power state of the portable device, determines whether a power of the portable device is sufficient or not, and performs the garbage block collection by changing a garbage block collection value and a garbage block collection operation cycle at the time of collecting the garbage blocks according to the determined result. In this case, the power managing unit 200 includes a block allocator 210, a garbage block collector 220, a power state checking unit 230, and a list storing unit 240.

The block allocator 210 allocates physical blocks to the nonvolatile memory 300.

That is, the block allocator 210 may allocate the physical blocks to the nonvolatile memory 300 according to a free block list stored in the list storing unit 240. In this case, the free block list contains available physical blocks where data does not exist.

The garbage block collector 220 collects the physical blocks allocated to the nonvolatile memory 300. The garbage block collector 220 according to the embodiment of the present invention collects the physical blocks according to a power state of the portable device.

That is, the garbage block collector 220 collects the physical blocks while considering an amount of power consumed by the portable device. In this case, if the power of the portable device is sufficient, the garbage block collector 220 collects the physical blocks up to those requiring large garbage block collection values, and sets a garbage block collection cycle to a small value so as to frequently perform a garbage block collection operation.

Meanwhile, if the power of the portable device is insufficient, the garbage block collector 220 collects only physical blocks requiring small garbage block collection values, and sets the garbage block collection cycle to a large value so as to perform the garbage block collection operation less than when the power of the portable device is sufficient. Hereinafter, an operation of performing garbage block collection on the basis of a garbage block collection value and a garbage block collection cycle will be described with reference to FIGS. 3A, 3B, 4A, and 4B.

Further, the garbage block collector 220 collects garbage blocks of the nonvolatile memory 300, when the number of free blocks in the free block list is not more than a predetermined value, or when the number of physical blocks occupied by non-active data is not less than a predetermined value. In this case, the garbage block collector 220 performs garbage block collection while considering a wear level.

For example, in the nonvolatile memory 300, when the data is updated, the existing data is not corrected, and new data is added. As a result, when the new data is added, the number of blocks occupied by the non-active data is increased. Therefore, the garbage block collector 220 collects blocks where the non-active data is located so as to be used when new blocks are allocated.

Further, the garbage block collector 220 performs a garbage block collection process at a predetermined cycle by using a timer (not shown), and performs the garbage block collection process when it is determined by a system idle detector (not shown) that a system enters an idle state. At this time, the garbage block collector 220 may perform garbage block collection after changing a garbage block collection cycle set on the basis of a power state of the portable device.

The power state checking unit 230 checks a power state of the portable device and transmits the checked result to the garbage block collector 220. In this case, the power state refers to a battery charging state of the portable device that is checked on the basis of a battery supply voltage of the portable device.

The list storing unit 240 stores an allocated block list for physical blocks allocated to the nonvolatile memory 300 and a free block list for available physical blocks.

The nonvolatile memory 300 corresponds to a region where data is stored, and even when power supply is stopped, the data stored in the nonvolatile memory 300 is not erased. For example, the nonvolatile memory may be a flash memory or the like.

Figure 3A:
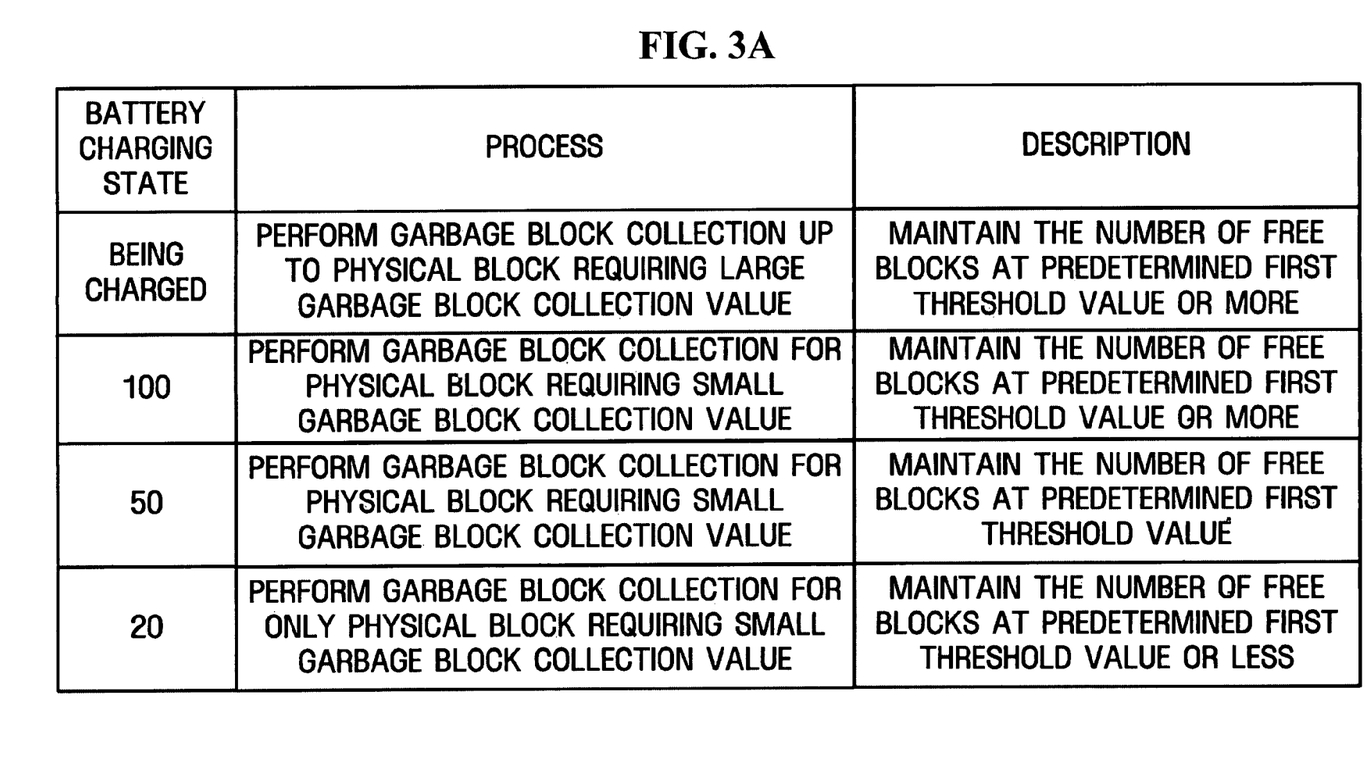
FIGS. 3A and 3B are diagrams illustrating an example of performing garbage block collection on the basis of a garbage block collection value in an apparatus for collecting garbage blocks of a nonvolatile memory according to a power state in accordance with another exemplary embodiment of the present invention.
Figure 3B:
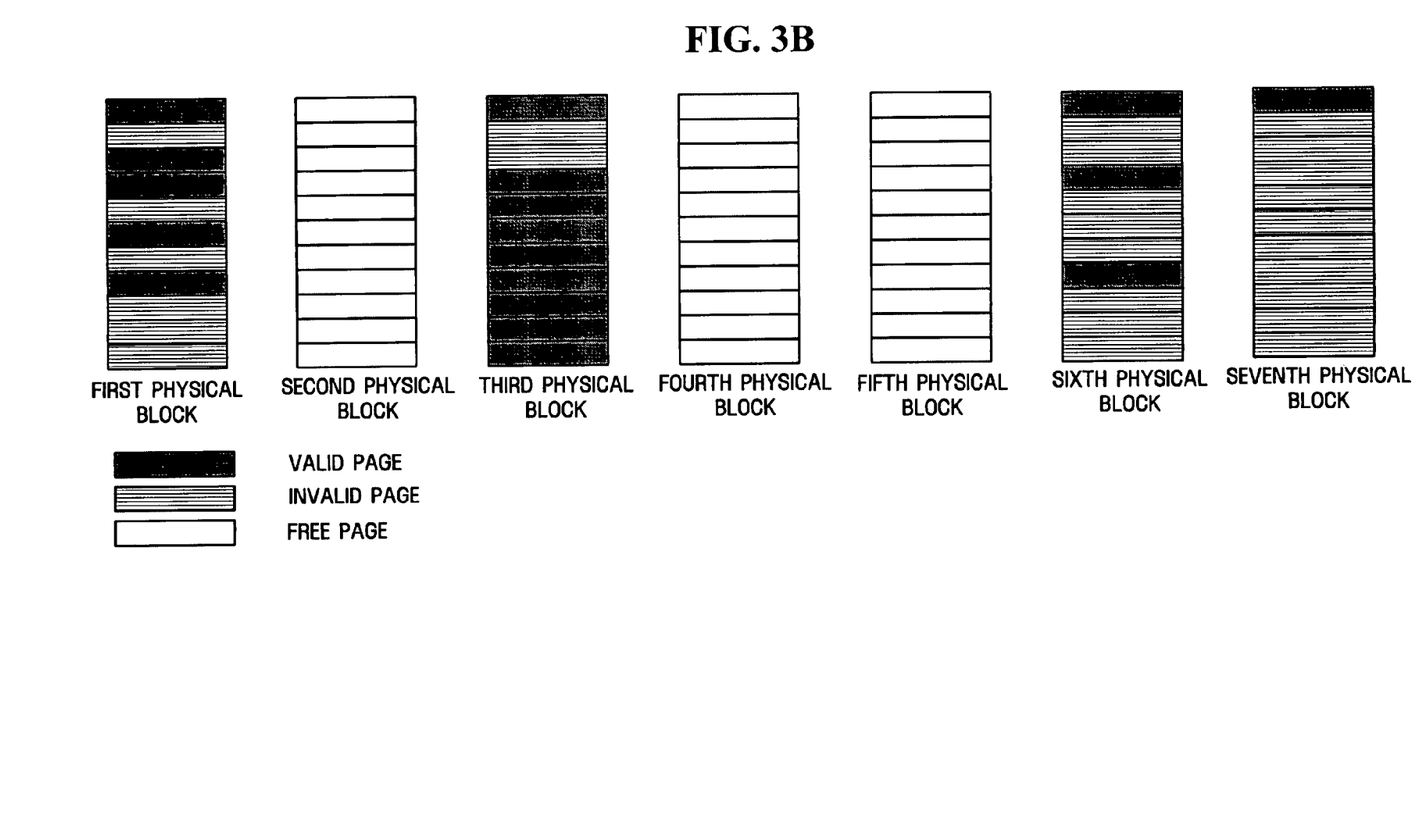

FIGS. 3A and 3B are diagrams illustrating an example where garbage block collection is performed on the basis of garbage block collection values in an apparatus for collecting garbage blocks of a nonvolatile memory according to a power state in accordance with another exemplary embodiment of the present invention.

If power state information of the portable device is transmitted by the power state checking unit 230 for checking the power state of the portable device, the garbage block collector 220 performs garbage block collection on the basis of a table shown in FIG. 3A.

When the battery charging state of the portable device transmitted by the power state checking unit 230 indicates a state in which the battery is charging, the garbage block collector 220 performs garbage block collection with respect to physical blocks including physical blocks requiring large garbage block collection values so as to maintain the number of free blocks at a predetermined first threshold value or more. In this case, when the battery is charging, the garbage block collector 220 collects all allocated physical blocks that can be collected by the garbage block collector 220. Further, the first threshold value refers to a set value of the number of free blocks needed when predetermined data is written, and the physical block requiring a large garbage block collection value refers to a physical block in which the number of valid pages is large.

That is, valid pages and invalid pages exist in the allocated physical block, and the garbage block collector 220 copies the valid pages to other physical blocks to then delete them, but the garbage block collector 220 immediately deletes the invalid pages. At this time, in a physical block where the number of valid pages is large, processes of copying valid pages and deleting them should be more frequently performed, as compared with a physical block where the number of valid pages is small. As a result, a power consumed in the physical block where the number of valid pages is large becomes larger than that in the physical block where the number of valid pages is small. Therefore, a garbage block collection value of the physical block where the number of valid pages is large is larger than that of the physical block where the number of valid pages is small.

Accordingly, the garbage block collector 220 calculates the number of valid pages in each physical block in the allocated block list stored in the list storing unit 240, and performs garbage block collection with respect to physical blocks including a physical block having the largest number of valid pages (that is, a physical block requiring a largest garbage block collection value) as the result of calculation.

For example, as shown in FIG. 3B, when seven physical blocks exist in the list storing unit 240, the garbage block collector 220 calculates the number of valid pages in each of first to seventh physical blocks.

According to the result of calculation, it can be understood that the number of valid pages is five in the first physical block, the number of valid pages is nine in the third physical block, the number of valid pages is three in the sixth physical block, and the number of valid pages is one in the seventh physical block. Further, it can be understood that the number of valid pages is zero in each of the second, the fourth, and the fifth physical blocks, and the second, the fourth, and the fifth physical blocks correspond to free blocks.

Therefore, the garbage block collector 220 performs garbage block collection with respect to the first, the third, the sixth, and the seventh physical blocks.

Further, when the remaining battery capacity of the portable device is still sufficient (that is, a battery charging state is 100 but not in a state of charging), the garbage block collector 220 collects physical blocks requiring small garbage block collection values (for example, the first, the sixth, and the seventh physical blocks) so as to maintain the number of free blocks at the predetermined first threshold value or more. In this case, when the remaining battery capacity of the portable device is sufficient, the garbage block collector 220 collects the allocated physical blocks excluding a physical block requiring a largest garbage block collection value (for example, the third physical block), among the allocated physical blocks in the list storing unit 240.

Further, when the remaining battery capacity of the portable device is insufficient (that is, a battery charging state is 50), the garbage block collector 220 collects only physical blocks requiring small garbage block collection values (for example, the sixth and the seventh physical blocks) so as to maintain the number of free blocks at the predetermined first threshold value.

Further, when a large capacity of battery is discharged in the portable device (that is, a battery charging state is 20), the garbage block collector 220 collects only a physical block requiring a smallest garbage block collection value (for example, the seventh physical block) so as to maintain the number of free blocks at the predetermined first threshold value or less.

Accordingly, since the garbage block collection is performed according to the remaining battery capacity of the portable device, the power consumed by the portable device can be less.

Figure 4A:
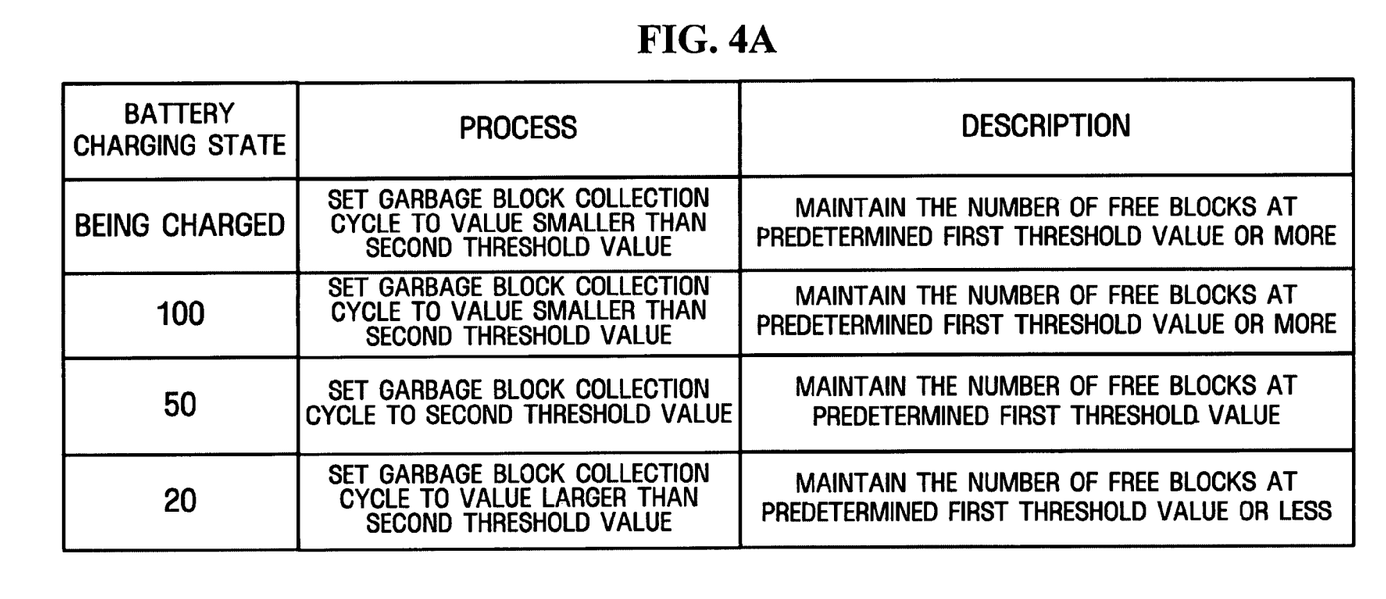
FIGS. 4A and 4B are diagrams illustrating an example of adjusting a garbage block collection cycle in an apparatus for collecting garbage blocks of a nonvolatile memory according to a power state in accordance with another exemplary embodiment of the present invention.
Figure 4B:
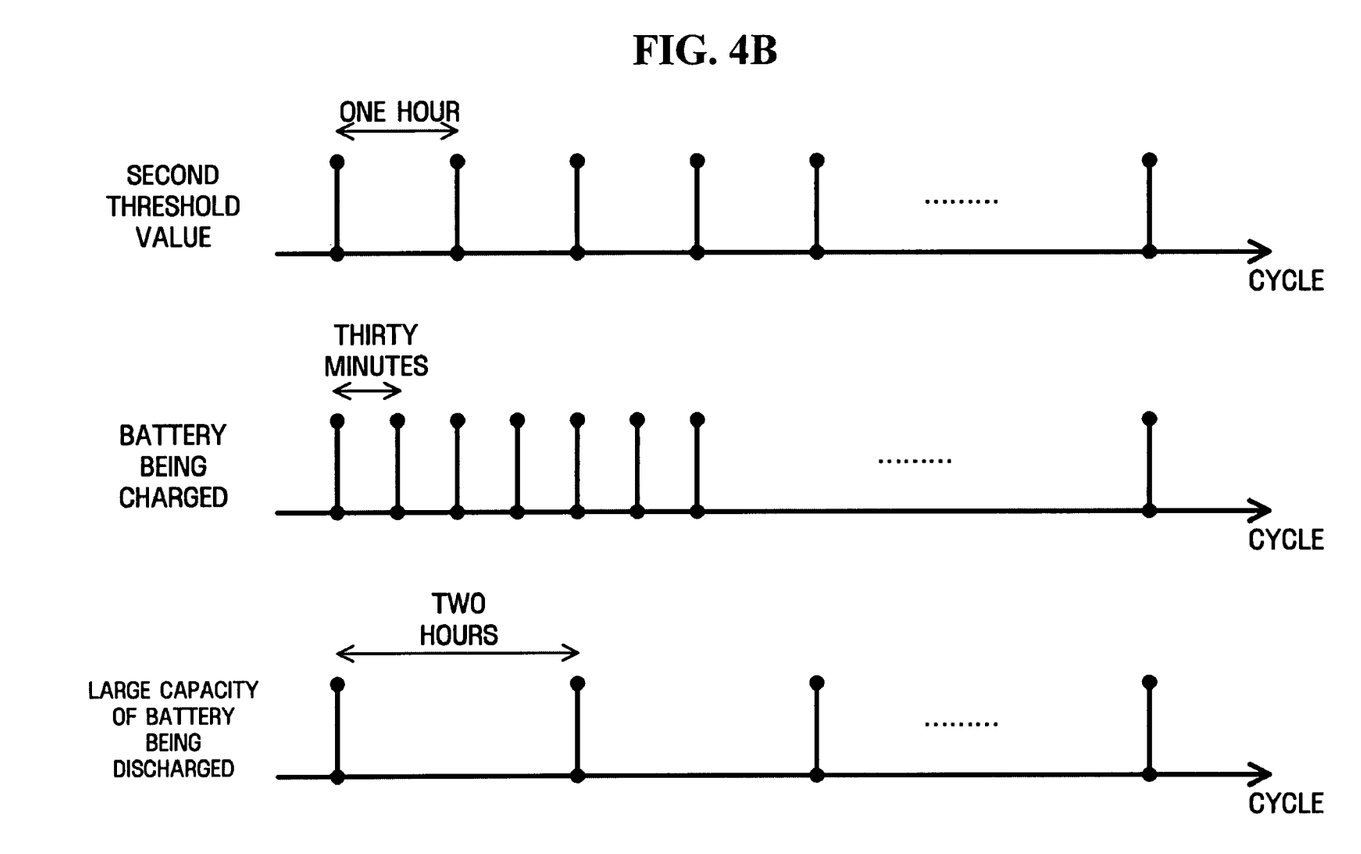

FIGS. 4A and 4B are diagrams illustrating an example of adjusting a garbage block collection cycle in an apparatus for collecting garbage blocks of a nonvolatile memory according to a power state in accordance with another exemplary embodiment of the present invention.

If power state information of the portable device is transmitted by the power state checking unit 230 for checking the power state of the portable device, the garbage block collector 220 performs garbage block collection on the basis of a table shown in FIG. 4A.

As a result of checking the battery charging state of the portable device, when the battery is charging, the garbage block collector 220 sets a garbage block collection cycle to a value smaller than a second threshold value so as to maintain the number of free blocks at a predetermined first threshold value or more, and then performs garbage block collection. In this case, the first threshold value refers to a set value of the number of free blocks needed when predetermined data is written, and the second threshold value refers to a set value of the garbage block collection cycle.

For example, as shown in FIG. 4B, in a case that a basically set garbage block collection cycle is one hour and the battery of the portable device is charging, the garbage block collector 220 changes the value of the garbage block collection cycle to thirty minutes so as to maintain the number of free blocks at the predetermined first threshold value or more.

Then, the garbage block collector 220 performs garbage block collection according to the changed set value of the garbage block collection cycle (for example, thirty minutes). Accordingly, the garbage block collection is frequently performed, and thus the number of free blocks can be maintained at the first threshold value or more.

Further, when the remaining battery capacity of the portable device is still sufficient (that is, a battery charging state is 100 but not in a state of charging), the garbage block collector 220 sets the garbage block collection cycle to a value smaller than the second threshold value (for example, third minutes) so as to maintain the number of free blocks at the predetermined first threshold value or more, and then performs garbage block collection.

Further, when the remaining battery capacity of the portable device is insufficient (that is, a battery charging state is 50), the garbage block collector 220 sets the garbage block collection cycle to the second threshold value (for example, one hour) so as to maintain the number of free blocks at the predetermined first threshold value, and then performs garbage block collection.

Further, when a large capacity of battery is discharged in the portable device (that is, a battery charging state is 20), the garbage block collector 220 sets the garbage block collection cycle to a value larger than the second threshold value so as to maintain the number of free blocks at the predetermined first threshold value or less, and then performs garbage block collection.

For example, as shown in FIG. 4B, in a case that a basically set garbage block collection cycle is one hour and the large capacity of battery is discharged in the portable device, the garbage block collector 220 changes a set value of the garbage block collection cycle to two hours so as to maintain the number of free blocks at the predetermined first threshold value or less.

Then, the garbage block collector 220 performs garbage block collection according to the changed set value of the garbage block collection cycle (for example, two hours). Accordingly, the garbage block collection is less performed, and thus the number of free blocks can be maintained at the predetermined first threshold value or less.

Figure 5:
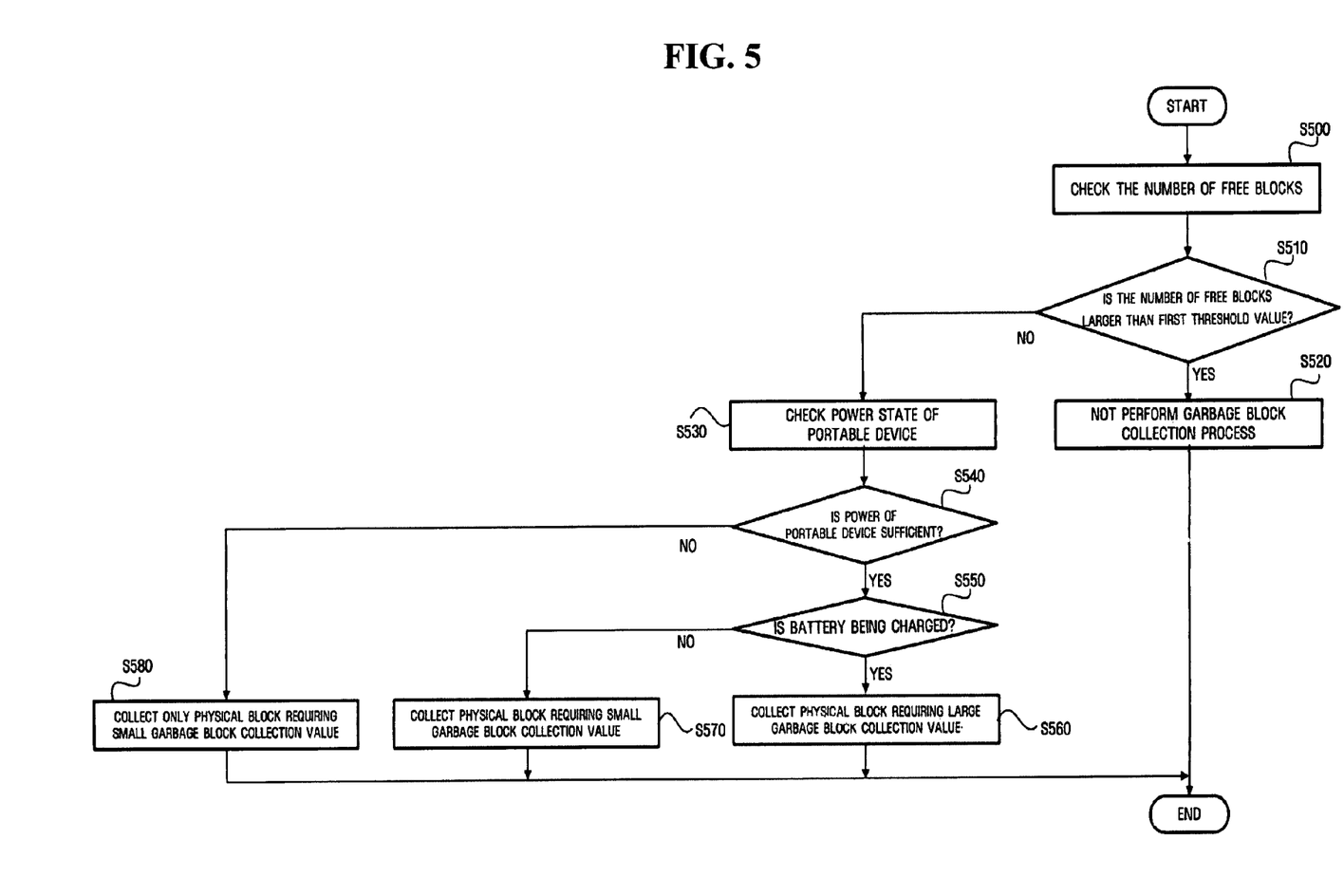
FIG. 5 is a flowchart illustrating an example of performing garbage block collection while referencing a garbage block collection value on the basis of a power state in a method of collecting garbage blocks of a nonvolatile memory according to a power state in accordance with another exemplary embodiment of the present invention.

FIG. 5 is a flowchart illustrating an example of performing garbage block collection while referencing garbage block collection values on the basis of a power state in a method of collecting garbage blocks of a nonvolatile memory according to a power state in accordance with another exemplary embodiment of the present invention.

First, the garbage block collector 220 checks the number of free blocks in the list storing unit 240 (S500). As the result of checking, if the number of free blocks is larger than the predetermined first threshold value (S510), the garbage block collector 220 does not perform garbage block collection (S520). In this case, the first threshold value corresponds to a set value of the number of free blocks needed when predetermined data is written.

As the result of checking, if the number of free blocks is smaller than the first threshold value (S510), the garbage block collector 220 checks the power state of the portable device detected by the power state checking unit 230 (S530).

As the result of checking, if the power of the portable device is sufficient (S540), the garbage block collector 220 determines whether the battery of the portable device is currently charging (S550). When it is determined that the battery of the portable device is currently charging, the garbage block collector 220 performs garbage block collection with respect to physical blocks including physical blocks requiring large garbage block collection values so as to maintain the number of free blocks in the list storing unit 240 at a first threshold value or more (S560). In this case, the physical block requiring a large garbage block collection value refers to a physical block in which the number of valid pages is large Further, when it is determined that the battery is not charging while the remaining battery capacity is still sufficient, the garbage block collector 220 collects physical blocks requiring small garbage block collection values so as to maintain the number of free blocks in the list storing unit 240 at a first threshold value or more (S570).

Meanwhile, as the result of checking, if the power of the portable device is not sufficient (S540), the garbage block collector 220 collects only physical blocks requiring small garbage block collection values so as to maintain the number of free blocks in the list storing unit 240 at a first threshold value (S580).

Figure 6:
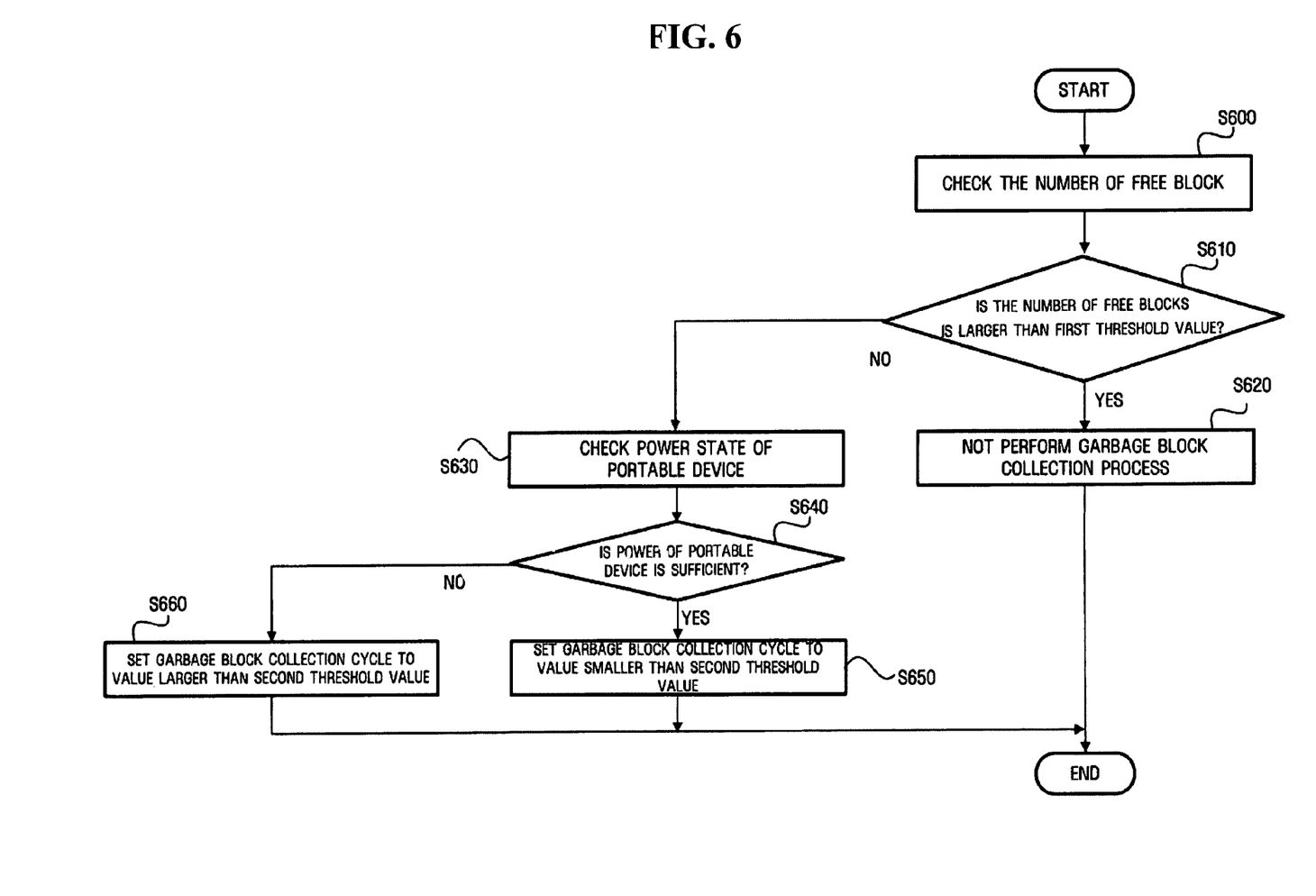
FIG. 6 is a flowchart illustrating an example of changing a garbage block collection cycle on the basis of a power state in a method of collecting garbage blocks of a nonvolatile memory according to a power state in accordance with another exemplary embodiment of the present invention.

FIG. 6 is a flowchart illustrating an example of changing a garbage block collection cycle on the basis of a power state in a method of collecting garbage blocks of a nonvolatile memory according to a power state in accordance with another exemplary embodiment of the present invention.

First, the garbage block collector 220 checks the number of free blocks in the list storing unit 240 (S600). As the result of checking, if the number of free blocks is larger than the predetermined first threshold value (S610), the garbage block collector 220 does not perform garbage block collection (S620). In this case, the first threshold value corresponds to a set value of the number of free blocks needed when predetermined data is written.

As the result of checking, if the number of free blocks is smaller than the first threshold value (S610), the garbage block collector 220 checks the power state of the portable device detected by the power state checking unit 230 (S630).

As the result of checking, if the power of the portable device is sufficient (S640), the garbage block collector 220 sets a garbage block collection cycle to a value smaller than a second threshold value so as to maintain the number of free blocks in the list storing unit 240 at a first threshold value or more (S650). In this case, the first threshold value corresponds to a set value of the number of free blocks needed when predetermined data is written, and the second threshold value corresponds to a set value of the garbage block collection cycle. Further, the state in which the power of the portable device is sufficient refers to a state in which the battery of the portable device is charging, or a state in which the battery is not currently charging while the battery is sufficiently charged.

Meanwhile, as the result of checking, if the power of the portable device is insufficient (S640), the garbage block collector 220 sets the garbage block collection cycle to a value larger than the second threshold value so as to maintain the number of free blocks in the list storing unit 240 at the predetermined first threshold value (S660).

Then, the garbage block collector 220 collects allocated physical blocks with the set garbage block collection cycle.

In the present invention, when the garbage block collection is performed on the basis of the power state of the portable device, it is possible to perform garbage block collection with respect to the allocated physical blocks while considering both the garbage block collection value and the garbage block collection operation cycle.

Although the present invention has been described in connection with the exemplary embodiments, it will be apparent to those skilled in the art that various modifications and changes may be made thereto without departing from the scope and spirit of the present invention. Therefore, it should be understood that the above embodiments are not limitative, but illustrative in all aspects.

The apparatus for collecting garbage blocks of a nonvolatile memory according to a power state and the method of collecting the same in accordance with the present invention can achieve the following effects.

The allocated blocks are collected by adjusting the garbage block collection value or the garbage block collection operation cycle on the basis of the power state of the portable device at the time of performing garbage block collection of the nonvolatile memory. Therefore, it is possible to efficiently use the power of the portable device.

Further, the garbage block collection is performed on the basis of the power state of the portable device, and therefore it is possible to reduce an amount of power consumed in the portable device by the garbage block collection.

What is claimed is:

1. An apparatus for collecting garbage blocks of a nonvolatile memory according to a power state, the apparatus comprising:
   a power managing unit which collects physical blocks allocated to the nonvolatile memory characterized in that a number of valid pages in physical blocks is determined and selection of physical blocks for collection is determined on the basis of the power state of a portable device;
   a block allocator which allocates physical blocks to the nonvolatile memory; and
   a garbage block collector which collects the allocated physical blocks on the basis of the power state;
   wherein the physical block is a block of memory and the garbage block is a block of memory allocated for deletion.

2. The apparatus of claim 1, wherein the power managing unit comprises:
   a power state checking unit which transmits the power state of the portable device checked by the garbage block collector; and
   a list storing unit which stores an allocated block list for the physical blocks allocated to the nonvolatile memory and a free block list for available physical blocks.

3. The apparatus of claim 2, wherein the garbage block collector adjusts a garbage block collection value on the basis of the power state of the portable device, when the allocated blocks are collected.

4. The apparatus of claim 2, wherein the garbage block collector adjusts a garbage block collection operation cycle on the basis of the power state of the portable device, when the allocated blocks are collected.

5. The apparatus of claim 2, wherein the garbage block collector collects the allocated physical blocks while considering a wear level.

6. The apparatus of claim 1, further comprising the nonvolatile memory which stores data.

7. A method of collecting garbage blocks of a nonvolatile memory according to a power state, the method comprising:
- checking the number of free blocks in the nonvolatile memory;
- checking the power state of a portable device, when the number of the free blocks is smaller than a first threshold value;
- calculating numbers of valid pages in physical blocks;
- performing garbage block collection with respect to physical blocks including physical blocks requiring large garbage block collection values, in which the number of valid pages is large, when a power of the portable device is sufficient; and
- performing the garbage block collection with respect to physical blocks requiring small garbage block collection values, in which the number of valid pages is small, when the power of the portable device is insufficient,
- wherein the physical block is a block of memory and the garbage block is a block of memory allocated for deletion.

8. The method of claim 7, wherein the garbage block collection is not performed, when the number of the free blocks is larger than the first threshold value.

9. The method of claim 7, wherein the garbage block collection is performed while considering a wear level.

10. A computer readable recording medium storing programs for executing the method of claim 7.

11. The method of claim 7, further comprising
- setting a garbage block collection cycle to a value smaller than a second threshold value, when the power of the portable device is sufficient;
- setting the garbage block collection cycle to a value larger than the second threshold value, when the power of the portable device is insufficient; and
- performing garbage block collection with respect to physical blocks on the basis of the set garbage block collection cycle.

12. The method of claim 11, wherein the garbage block collection is not performed, when the number of the free blocks is larger than the first threshold value.

13. The method of claim 11, wherein the garbage block collection is performed while considering a wear level.

14. A computer readable recording medium storing programs for executing the method of claim 11.

* * * * *